(12) United States Patent
Giessler et al.

(10) Patent No.: US 7,578,877 B2
(45) Date of Patent: Aug. 25, 2009

(54) TWO-COMPONENT COATING SYSTEM FOR EQUIPPING SMOOTH SURFACES WITH EASY-TO-CLEAN PROPERTIES

(75) Inventors: Sabine Giessler, Rheinfelden (DE); Eckhard Just, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/567,023

(22) PCT Filed: Jun. 9, 2004

(86) PCT No.: PCT/EP2004/051072

§ 371 (c)(1), (2), (4) Date: Feb. 3, 2006

(87) PCT Pub. No.: WO2005/014731

PCT Pub. Date: Feb. 17, 2005

(65) Prior Publication Data

US 2006/0185555 A1 Aug. 24, 2006

(30) Foreign Application Priority Data

Aug. 5, 2003 (DE) .................. 103 36 544

(51) Int. Cl.
- *C09D 183/04* (2006.01)
- *C09D 183/06* (2006.01)
- *C09D 183/08* (2006.01)

(52) U.S. Cl. .................. 106/287.13; 106/287.14; 106/287.16; 427/299; 427/358; 427/359; 427/368; 427/387

(58) Field of Classification Search ............ 106/287.13, 106/287.14, 287.16; 427/299, 358, 359, 427/368, 387

See application file for complete search history.

(56) References Cited

U.S. PATENT DOCUMENTS

| | | | |
|---|---|---|---|
| 4,678,835 A * | 7/1987 | Chang et al. ................ 525/100 |
| 5,264,010 A * | 11/1993 | Brancaleoni et al. ......... 51/308 |
| 5,591,818 A | 1/1997 | Standke et al. |
| 5,629,400 A | 5/1997 | Standke et al. |
| 5,679,147 A | 10/1997 | Standke et al. |
| 5,808,125 A | 9/1998 | Standke et al. |
| 5,817,854 A | 10/1998 | Horn et al. |
| 5,849,942 A | 12/1998 | Standke et al. |
| 5,863,509 A | 1/1999 | Standke et al. |
| 5,885,341 A | 3/1999 | Standke et al. |
| 5,932,757 A | 8/1999 | Standke et al. |
| 5,997,943 A | 12/1999 | Azzopardi et al. |
| 6,054,601 A | 4/2000 | Standke et al. |
| 6,133,466 A | 10/2000 | Edelmann et al. |
| 6,176,918 B1 | 1/2001 | Glausch et al. |
| 6,177,582 B1 | 1/2001 | Jenkner et al. |
| 6,228,936 B1 | 5/2001 | Standke et al. |
| 6,239,194 B1 | 5/2001 | Standke et al. |
| 6,251,989 B1 | 6/2001 | Edelmann et al. |
| 6,255,513 B1 | 7/2001 | Standke et al. |
| 6,255,516 B1 | 7/2001 | Jenkner et al. |
| 6,288,256 B1 | 9/2001 | Standke et al. |
| 6,361,871 B1 | 3/2002 | Jenkner et al. |
| 6,395,858 B1 | 5/2002 | Mack et al. |
| 6,426,150 B1 | 7/2002 | Jenkner et al. |
| 6,491,838 B1 | 12/2002 | Standke et al. |
| 6,500,883 B1 | 12/2002 | Mack et al. |
| 6,534,667 B1 | 3/2003 | Standke et al. |
| 6,641,870 B2 | 11/2003 | Bartkowiak et al. |
| 6,713,186 B1 | 3/2004 | Jenkner et al. |
| 6,767,982 B2 | 7/2004 | Standke et al. |
| 6,841,197 B2 | 1/2005 | Standke et al. |
| 6,858,746 B2 | 2/2005 | Giessler et al. |
| 2002/0127415 A1 | 9/2002 | Standke et al. |
| 2002/0192385 A1 | 12/2002 | Jenkner et al. |
| 2002/0193504 A1 | 12/2002 | Brueck et al. |
| 2006/0185555 A1 | 8/2006 | Giessler et al. |

FOREIGN PATENT DOCUMENTS

| | | |
|---|---|---|
| DE | 196 06 011 | 8/1997 |
| WO | 96/16109 | 5/1996 |

OTHER PUBLICATIONS

U.S. Appl. No. 12/096,647, filed Jun. 9, 2008, Giessler et al.
U.S. Appl. No. 12/090,327, filed Apr. 15, 2008, Giessler et al.

* cited by examiner

*Primary Examiner*—David M Brunsman
(74) *Attorney, Agent, or Firm*—Oblon, Spivak, McClelland, Maier & Neustadt, P.C.

(57) ABSTRACT

The present invention relates to a two-component system for equipping surfaces with an oil, water, and dirt repellent coating, the two-component system being composed of a formulation 1 and a formulation 2, and both formulations being mixed together shortly before application. The invention further relates to a method of applying the two-component system to surfaces. The invention additionally relates to the use of the two-component system.

19 Claims, No Drawings

TWO-COMPONENT COATING SYSTEM FOR EQUIPPING SMOOTH SURFACES WITH EASY-TO-CLEAN PROPERTIES

This application is a 371 of PCT/EP04/51072, filed Jun. 9, 2004.

The present invention relates to a new system for equipping surfaces with an oil, water, and dirt repellent coating. The invention further relates to a method of applying the new system to surfaces, and also to the use of the new system.

Surfaces with oil, water, and dirt repellency properties are referred to in the everyday art as "easy to clean".

The known easy-to-clean coatings, i.e., coatings with oil, water, and dirt repellency properties, based on fluoroalkylsilanes or alkylsilanes are well known (e.g. DE 834 002, U.S. Pat. No. 3,012,006, GB 935 380, U.S. Pat. No. 3,354,022, DE 15 18 551, DE 38 36 815, DE 42 18 657, DE 195 44 763, EP 0 748 357, EP 0 799 873, EP 0 846 716, JP 2001/115151, EP 1 033 395, EP 1 101 787).

The most suitable of the existing coating systems in terms of the easy-to-clean properties are those based on fluoroorganofunctional silanes and/or siloxanes. Systems described for producing an easy-to-clean coating include 100% systems, solvent-containing systems, emulsions, and aqueous systems.

For the majority of users, however, the known easy-to-clean coatings are awkward and complicated to implement.

For preparing such coating systems the ingredients, such as solvent, fluoroalkylsilane, water, and catalyst, whose safety aspects must be observed, are generally first weighed out into a suitable stirred vessel and reacted with stirring under control for several hours. The majority of end users are unable to carry out this complicated procedure.

Generally the coatings must also be baked at high temperatures (DE 101 35 684), so making them unsuitable for certain applications, on windshields for example.

Other products on the market, which do not have these disadvantages, nevertheless have a short storage stability or low abrasion resistance in coatings obtained from them (EP 0 846 715).

Furthermore, some of the known coating materials contain toxic and environmentally objectionable solvents, such as halogenated hydrocarbons or benzine.

Further, the application of an aqueous composition of a metal oxide, particularly a cerium oxide slurry, as a polishing agent for improving the adhesion properties of glass coatings has been known for a long time (Glass Technology, Vol. 12, No. 5, October 1971, pp. 131-135).

It was an object of the present invention to provide a coating system for easy-to-clean applications which is convenient for the end user and at the same time is effective. A particular concern of the invention was to provide a system suitable for easy-to-clean coating on smooth surfaces.

The object posed is achieved in accordance with the invention as specified in the claims.

Thus it has been found, surprisingly, that an easy-to-clean coating can be applied effectively, durably, and in a simple and user-friendly fashion to a surface, in particular a smooth surface, by using a special two-component system based on organofunctional silicon compounds if the surface to be treated is cleaned and if desired pretreated, i.e., the cleaned surface is advantageously polished with a definitely abrasive, water-containing composition, the surface not being visibly optically roughened and the number of reactive surface groups being additionally increased, formulations 1 and 2 of the two-component system are combined and mixed intensely, preferably by shaking or stirring, not until shortly before application, the mixture is reacted for at least 2 minutes, preferably from 3 to 5 minutes, and is advantageously effective generally for up to 100 hours after the formulations of the two-component system have been combined, and thereafter the mixture is applied to the surface and reacted.

The two-component system of the invention, composed of a substantially water-free formulation 1 and of a formulation 2, advantageously possesses a storage stability of more than one year.

Furthermore, in accordance with the invention, the mixture to be applied to the surface to be treated, based on the two-component system, is readily amenable to the user, is activated generally after just 2 to 5 minutes, and advantageously is ready to use successfully for up to around 100 hours (this is also called the pot life). In addition to this an outstanding coating quality with substantially reproducible application properties is obtained. Moreover, coatings obtainable in accordance with the invention have outstanding easy-to-clean properties, but in particular outstanding hydrophobic and oleophobic properties. A particularly noteworthy feature is that coatings obtainable in accordance with the invention also have, unexpectedly, a comparatively high, excellent abrasion resistance.

Thus it is possible with particular advantage in accordance with the invention to equip smooth surfaces, such as windshields, glass shower cubicles, glass facades on houses, and also wall tiles and sanitary ceramics with an easy-to-clean coating in an advantageous and durable fashion.

In addition to these qualities, easy-to-clean coatings obtainable in accordance with the invention are notable for outstanding abrasion resistance.

The present invention accordingly provides a two-component system for equipping surfaces with an oil, water, and dirt repellent coating, the two-component system being composed of a formulation 1 and a formulation 2 and both formulations being mixed together not until shortly before application.

Generally speaking, the two-component system of the invention is obtained by combining the respective ingredients for formulation 1 and, separately, combining the respective ingredients for formulation 2. Formulations 1 and 2 of the two-component system are generally kept in two separate, preferably sealable, vessels until shortly before they are used, and can be stored thus at room temperature in outstanding fashion for a year or more without loss of activity.

Formulation 1 of the two-component system of the invention suitably includes at least one fluoroalkylsilane of the general formula I $$R^1-Y_u-(CH_2)_2Si(CH_3)_q(R^2)_{3-q} \quad (1)$$

in which $R^1$ is a linear, branched or cyclic and also mono-, oligo- or perfluorinated alkyl group having 1 to 13 carbon atoms or a mono-, oligo- or perfluorinated aryl group, Y is a $—(CH_2)$, O or S group and u is 0 or 1, $R^2$ is a chlorine atom or an alkoxy group having 1 to 4 carbon atoms, preferably methoxy, ethoxy, propoxy, isopropoxy, butoxy and/or 2-methoxyethoxy, and q is 0 or 1, and/or at least one alkylsilane of the general formula II $$R^3Si(CH_3)_p(R^4)_{3-p} \quad (II),$$

In which $R^3$ is a linear, branched or cyclic alkyl group having 1 to 18 carbon atoms, $R^4$ is a chlorine atom or an alkoxy group having 1 to 4 carbon atoms, and p is 0 or 1, preferably methoxy, ethoxy, propoxy, isopropoxy, butoxy and/or 2-methoxyethoxy.

In formulation 1 the amount of silane of the formula I and/or II is preferably from 0.1 to 60% by weight, based on formulation 1, more preferably from 0.5 to 10% by weight, very preferably from 1 to 4% by weight.

Formulation 1 of the invention of the present two-component system may also include at least one silane, preferably a silicic ester, of the general formula III $$Si(R^5)_4 \quad \quad (III)$$

in which groups $R^5$ are identical or different and $R^5$ is a chlorine atom or an alkoxy group having 1 to 4 carbon atoms, preferably methoxy, ethoxy, propoxy, isopropoxy, butoxy and/or 2-methoxyethoxy, and/or at least one oligomeric silicic ester, preferably an alkyl silicate, such as DYNASIL® 40, of the general formula IV $$(R^6)_n SiO_{(4-n)/2} \quad \quad (IV),$$

in which groups $R^6$ are identical or different and $R^6$ is a hydroxyl group or an alkoxy group having 1 to 4 carbon atoms, preferably methoxy, ethoxy, propoxy, isopropoxy, butoxy and/or 2-methoxyethoxy, and n is 1, 2 or 3, it being possible for such oligomeric silanes to possess suitably an average degree of oligomerization of from 2 to 40, preferably from 3 to 20, i.e., number of Si units per molecule, and to be present in linear, branched or cyclic form and also a three-dimensional structure, and/or condensates and/or cocondensates of aforementioned silicon compounds of the formulae I to IV and/or mixtures of aforementioned silicon compounds.

In formulation 1 the amount silane of formula III and/or of a silicic ester of formula IV may suitably total $\leq 10\%$ by weight, based on formulation 1, and the amount is preferably from 0.001 to 2% by weight, more preferably from 0.1 to 0.6% by weight.

Preferred monomeric or oligomeric silicon compounds of formulae I, II, III or IV are: tridecafluoro-1,1,2,2-tetrahydrooctyltrimethoxysilane, tridecafluoro-1,1,2,2-tetrahydrooctyltriethoxysilane, n-propyltrimethoxysilane, n-propyltriethoxysilane, n-butyltriethoxysilane, n-butyltrimethoxysilane, phenyltrimethoxysilane, phenyltriethoxysilane, n-octyltriethoxysilane, n-octyltrimethoxysilane, isooctyltriethoxysilane, isooctyltrimethoxysilane, hexadecyltrimethoxysilane, hexadecyltriethoxysilane, octadecyltrimethoxysilane, octadecyltriethoxysilane, tetraethoxysilane, and tetraethyl orthosilicate, ethyl polysilicate, such as DYNASIL® 40.

Formulation 1 of the two-component system of the invention may further contain at least one solvent or diluent in an amount of from 40 to 99.9% by weight, based on formulation 1. Formulation 1 contains preferably from 90 to 99.5% by weight of solvent and/or diluent, more preferably from 96 to 99% by weight.

Formulation 2 of the two-component system of the invention contains water preferably in an amount of from 0.001 ppm by weight to 100% by weight, based on formulation 2, more preferably from 1 to 99.9% by weight, very preferably from 10 to 99.9% by weight.

Formulation 2 of the two-component system of the invention further suitably contains an organic or inorganic acid, preferably in an amount of from 0.001 to 10% by weight, based on formulation 2. Particular preference is given in this context to from 0.05 to 1% by weight, in particular from 0.1 to 0.2% by weight. Thus, for example, an acid of type HX, $H_2X$ or $H_3X$ can be used, X being an anion. Examples of acids used for preparing a formulation 2 with advantage include the following: formic acid, acetic acid, nitric acid, hydrochloric acid, sulfuric acid, and phosphoric acid. It is also possible here to use a chlorosilane which under hydrolysis conditions gives off HCl, an example being $SiCl_4$.

Formulation 2 may also contain a solvent or diluent in an amount of <100% by weight, based on formulation 2. Preference is given in this context to from 0.01 to 90% by weight, more preferably from 0.1 to 20% by weight, of solvent and/or diluent.

By way of example, but not exclusively, one formulation or both formulations of the two-component system of the invention may comprise at least one chlorine-free solvent and/or diluent from the group of the alcohols, such as methanol, ethanol, propanol, isopropanol, 1-methoxy-2-propanol or butanol, the glycols, such as butyl glycol, ethyl glycol, propyl glycol or butyl glycol, the ethylene glycol ethers, the propylene glycol ethers, the ketones, such as acetone or methyl ethyl ketone, and the esters, such as ethyl acetate. Ethanol and isopropanol are used with particular preference.

Moreover, formulation 1 or 2 may contain a wetting aid, such as butyl glycol, 1-methoxy-2-propanol or a polyether siloxane, alcohol alkoxylates, polyethers, and polyether-modified trisiloxanes for example, in an amount of $\leq 10\%$ by weight, based on the respective formulation, preferably from 2 to 6% by weight.

Generally speaking, formulations 1 and 2 of the two-component system of the invention can be obtained simply and economically by mixing the respective ingredients. Amounts (% by weight) specified here refer in each case to the corresponding formulation, with the respective ingredients of one formulation together making not more than 100% by weight.

The present invention likewise provides a method of equipping surfaces with an oil, water, and dirt repellent coating, which comprises cleaning and if desired pretreating the surface, combining and mixing formulations 1 and 2 of the two-component system, reacting the mixture for at least 2 minutes, and thereafter applying the mixture to the surface.

The surface to be treated in accordance with the invention is suitably first precleaned, using a fat-dissolving liquid, such as isopropanol, acetone or a conventional glass cleaner to clean or polish the surface, for example.

In addition the surface can also be pretreated. For carrying out a pretreatment in the method of the invention preference is thus given to an abrasive, aqueous composition suitably comprising oxide particles having an average diameter ($d_{50}$) of less than 6 µm, preferably from 0.05 to 5 µm. Said abrasive compositions may be in the form of a slurry or dispersion or paste, called metal oxide slurry hereinbelow. In the method of the invention it is particularly preferred to use an aqueous or aqueous/alcoholic metal oxide slurry comprising preferably cerium oxide, aluminum oxides, aluminum hydroxide, aluminum oxide hydroxide, magnesium oxide, iron oxides, titanium oxides, titanium dioxide for example, metatitanic acid, zirconium oxides, tin dioxide, silicates, aluminum silicates for example, silicon oxides, pyrogenic silica, such as AEROSIL®, for example, or precipitated silica, or a mixture of aforementioned oxides.

Thus it is possible in accordance with the Invention to equip surfaces, in particular smooth surfaces, such as windshields, glass shower cubicles, glass facades on houses, and also wall tiles and sanitary ceramics with an abrasion-resistant, easy-to-clean coating in an advantageous and durable fashion.

After cleaning and/or pretreatment, the mixture of the two-component system of the invention is suitably applied. Application of the mixture formed from formulations 1 and 2 to the surface takes place preferably by spraying, brushing, flow-coating, dipping, knife coating or polishing.

In the method of the invention the coating of the surface to be treated is carried out suitably at a (surface) temperature of from 0 to 50° C., preferably from 5 to 25° C., the coating obtained is suitably crosslinked at room temperature. After the mixture formed from formulations 1 and 2 has been applied, however, it is also possible to carry out thermal aftertreatment in addition. For instance, in order to accelerate complete crosslinking, it is possible to carry out heat treatment at a temperature of up to 330° C., preferably up to 280° C., in particular from 50° C. to 150° C. For this purpose it is possible to use a fan, a heatable drying chamber, or a blow dryer for example.

The general procedure for the method according to the invention is that the substrate surface to be treated, generally a smooth substrate surface, is cleaned. If appropriate the surface can additionally be pretreated, i.e. activated. Formulations 1 and 2 of the two-component system are generally combined and mixed thoroughly, preferably by intense shaking or stirring, not until shortly before application, and at ambient temperature. For this purpose, formulations 1 and 2 can be adjusted in such a way that they can be mixed in a ratio of 1:1, advantageously both in volume terms and in weight terms. A mixture obtained in this way is suitably reacted for at least 2 minutes. This activating operation can also be assisted by intense shaking or stirring. Thereafter the mixture is applied to the surface. The pot life is generally up to one hour. Normally, however, the mixture can be employed effectively for up to 100 hours following combination. Furthermore, the coating obtained in this way can be thermally aftertreated.

The contact angle between a coating and a drop of liquid applied to it is a measure of the easy-to-clean properties of the surface and is generally determined in accordance with DIN EN 828. Coatings of the invention advantageously have a contact angle >80°, preferably from 90 to 130°.

The coatings obtainable in accordance with the invention are accordingly distinguished by outstanding easy-to-clean properties and also by resistance to a wide variety of influences, such as weather, chemicals, solvents, and in particular by very good abrasion resistance.

The present invention hence also provides for the use of a two-component system of the invention for coating surfaces for equipping them with water, oil, and dirt repellency properties and also for improving the weather stability, the corrosion resistance, the abrasion resistance and scratch resistance, the chemical resistance, especially solvent resistance, and for protecting against graffiti, also referred to as antigraffiti effect.

The invention further provides for the use of a two-component system of the invention for the coating, likewise in accordance with the invention, of substrate surfaces, i.e., glass surfaces, windshields, window panes, glass facades, and shower cubicles, for example, ceramic surfaces, in particular glazes, metal surfaces, such as copper and aluminum, and polymer surfaces.

The present invention is illustrated by the following examples without being restricted in its subject-matter

COMPARATIVE EXAMPLES

The formulations as described In comparative examples 1 to 4 can be used directly for smooth surfaces.

Comparative Example 1

DYNASYLAN® F 8263 from Degussa

The ready-to-use coating system based on activated fluoroalkylsilane possesses a storage stability of <6 months.

Comparative Example 2

CLEARSHIELD® from RITEC:

Coating system having the following composition from NMR analysis:
about 10 mol % dimethylpolysiloxane
about 32 mol % isopropanol
about 58 mol % 1,1-dichloro-1-fluoroethane Comparative Example 3

CRYSTAL GUARD® from Chemetall:

2.5-10% triethoxyoctylsilane
1-2.5% trimethoxyphenylsilane
>50% heptane

Comparative Example 4

AQUAPERL® from PPG composed of petroleum and a silane

Inventive Examples

The following applies to examples 1 to 5:
For the preparation of a coating system first of all 2 formulations were prepared separately, using as mixing vessel a 1 l glass bottle with screw closure in each case.

Example 1

Formulation 1 (K-1):
  10.0 g of DYNASYLAN® F 8261 (tridecafluorooctyltriethoxysilane) were mixed with 240.0 g of isopropanol.

Formulation 2 (K-2):
  224.0 g of $H_2O$, 25.0 g of isopropanol, and 1.0 g of hydrochloric acid (37% strength) were mixed. Composition 2 possesses a melting point of −4° C.

Example 2

Formulation 1 (K-1):
  10.0 g of DYNASYLAN® F 8261 (tridecafluorooctyltriethoxysilane) and 1.5 g of DYNASIL® A (tetraethoxysilane) were mixed with 238.5 g of isopropanol.

Formulation 2 (K-2):
  224.0 g of $H_2O$, 25.0 g of isopropanol, and 1.0 g of hydrochloric acid (37% strength) were mixed.

Example 3

Formulation 1 (K-1):
  10.0 g of DYNASYLAN® OCTEO (n-octyltriethoxysilane) were mixed with 240.0 g of isopropanol.

Formulation 2 (K-2):

224.0 g of $H_2O$, 25.0 g of isopropanol, and 1.0 g of hydrochloric acid (37% strength) were mixed.

Example 4

Formulation 1 (K-1):

10.0 g of DYNASYLAN® F 8261 (tridecafluorooctyltriethoxysilane) were mixed with 240.0 g of ethanol.

Formulation 2 (K-2):

124.0 g of $H_2O$, 125.0 g of isopropanol, and 1.0 g of hydrochloric acid (37% strength) were mixed. This formulation 2, with a melting point of −4° C., has an extremely low sensitivity to frost.

Example 5

Formulation 1 (K-1):

10.0 g of DYNASYLAN® F 8261 (tridecafluorooctyltriethoxysilane) were mixed with 240.0 g of isopropanol.

Formulation 2 (K-2):

187.15 g of $H_2O$, 62.5 g of isopropanol, and 0.35 g of hydrochloric acid (37% strength) were mixed.

At application the following procedure was carried out for examples 1 to 5:

The blending of formulations K-1 and K-2 of the two-component system was carried out by the respective user: thus, prior to application, first 250 g of K-2 were added to 250 g of K-1 (examples 1 to 4) or 20 ml of K-2 were added to 20 ml of K-1 (example 5), the lid was closed tightly, and the mixture was shaken for 2 minutes. After 2 minutes the solution was ready to use.

The individual formulations (K-1 and K-2) were hitherto stable on storage for around 1 year, and application systems produced from them can be used advantageously for about 2 days.

From the formulations described above, comparative examples 1 to 3 and inventive examples 1 to 5, coatings were produced on glass. The surfaces were cleaned prior to application so that they were free of grease in particular. Pretreatment of the glass surface (size of the glass plates: 0.15 m×0.15 m): the glass plates were precleaned with isopropanol and activated abrasively with an aqueous cerium oxide slurry (inventive examples 1 to 5 and also comparative examples). The dried-on cerium oxide was removed without residue, using a paper cloth.

The use formulations, in other words a solution formed from the blending of K-1 and K-2 or the solutions of the comparative examples, were each applied to the glass surfaces in order to test the resistance of the formulation. The solutions of inventive examples 1 to 5 were applied in each case after a pot life of 2 minutes (directly after mixing), 15 minutes, 1 hour, and 6 hours. Approximately 50 ml in each case of the total formulations were required for coating.

The ready-to-use formulations were distributed as a liquid film on the glass surface, rubbed using a paper cloth, and then polished, leaving no residue. A hydrophobic effect came about generally after just 5 minutes at room temperature.

Performance Tests:

Abrasion resistance (under water or an aqueous 3% by weight aluminum silicate slurry) after a defined number of abrasion cycles with Glitzi sponge scourer, 1 kg applied weight, and water.

Repeat measurement of the static contact angles (CA) with DI water and contact angle measuring instrument G-15 from KRÜSS, before and after each abrasion test.

Table 1:

Results of the performance tests for the comparative examples (abrasion test with water as lubricant for the abrasion machine)

2-component coating system for equipping smooth surfaces with oil repellency, water repellency, and dirt repellency properties, i.e., easy-to-clean properties

TABLE 1

Results of the performance tests for the comparative examples

| Comparative example | Unexposed Contact angle [°] | After 5000 abrasion cycles under water Contact angle [°] |
|---|---|---|
| 1 | 98 | 90 |
| 2 | 94 | 67 |
| 3 | 87 | 59 |

TABLE 2

Results of the performance tests of the coatings formed examples 1 to 3, with water as lubricant for the abrasion machine

| Example | Pot life [min.] | Contact angle [°] after abrasion exposure under water in cycles | | | | |
|---|---|---|---|---|---|---|
| | | 0 (unexposed) | 24 000 | 32 000 | 56 000 | 80 000 |
| 1 | 2 | 95 | 94 | 92 | 83 | 87 |
| 1 | 15 | 96 | 93 | 91 | 83 | 77 |
| 1 | 60 | 98 | 93 | 91 | 76 | 79 |
| 1 | 360 | 96 | 94 | 87 | 85 | 87 |
| 2 | 2 | 106 | 92 | 96 | 95 | 94 |
| 2 | 15 | 106 | 98 | 92 | 91 | 91 |
| 2 | 60 | 105 | 99 | 95 | 93 | 95 |
| 2 | 360 | 104 | 99 | 90 | 98 | 92 |
| 3 | 2 | 100 | 86 | 83 | 75 | 79 |
| 3 | 15 | 99 | 88 | 85 | 84 | 85 |
| 3 | 60 | 104 | 89 | 88 | 87 | 82 |
| 3 | 360 | 103 | 89 | 90 | 80 | 77 |

The abrasion test using an abrasive solution for the abrasion machine further illustrates the scratch resistance or abrasion resistance of the coating. Therefore the following examples were tested with a 3% strength by weight aqueous aluminum silicate solution (the aluminum silicate particles have a size of about 80 μm). At contact angles of less than 80°, the coatings are no longer referred to as easy-to-clean, and therefore the measurements were discontinued when this figure was reached.

TABLE 3

Abrasion cycles using an aqueous 3% strength by weight aluminum silicate slurry as lubricant for the abrasion machine

| Example | Pot life [min.] | Contact angle [°] after cycles | | | | | |
|---|---|---|---|---|---|---|---|
| | | 0 | 4 000 | 6 000 | 8 000 | 10 000 | 12 000 |
| comp. 1 | 15 | 97 | 50 | — | — | — | — |
| comp. 2 | 15 | 90 | 65 | — | — | — | — |
| comp. 4 | 15 | 96 | 95 | 86 | 79 | 64 | — |
| 1 | 15 | 101 | 93 | 92 | 97 | 80 | 83 |
| 4 | 2 | 105 | 94 | 90 | 91 | 95 | 86 |
| 4 | 15 | 101 | 96 | 92 | 89 | 90 | 81 |
| 4 | 60 | 101 | 97 | 96 | 91 | 90 | 83 |

TABLE 3-continued

Abrasion cycles using an aqueous 3% strength by weight aluminum silicate slurry as lubricant for the abrasion machine

| Example | Pot life [min.] | Contact angle [°] after cycles | | | | | |
|---|---|---|---|---|---|---|---|
| | | 0 | 4 000 | 6 000 | 8 000 | 10 000 | 12 000 |
| 5 | 2 | 106 | 95 | 87 | 90 | 90 | 72 |
| 5 | 15 | 103 | 98 | 90 | 91 | 88 | 75 |

What is claimed is:

1. A two-component system for equipping a surface with an oil, water, and dirt repellent coating, the system, comprising:
   a first sealed vessel comprising a formulation 1; and
   a second sealed vessel comprising a formulation 2;
   wherein:
   the formulation 1 comprises at least one carbosilane selected from the group consisting of:
   fluoroalkylsilanes of formula (I)

$$R^1-Y_u-(CH_2)_2Si(CH_3)_q(R^2)_{3-q} \quad (I)$$

wherein $R^1$ is a mono, oligo, or perfluorinated linear, branched, or cycloalkyl group comprising 1-13 carbon atoms or $R^1$ is a mono, oligo, or perfluorinated aryl group, wherein Y is a $-(CH_2)$, O or S group, wherein u is 0 or 1, wherein $R^2$ is a chlorine atom or an alkoxy group comprising 1 to 4 carbon atoms, and wherein q is 0 or 1; and
   alkylsilanes of formula (II)

$$R^3Si(CH_3)_p(R^4)_{3-p} \quad (II)$$

wherein $R^3$ is a linear, branched or cyclic alkyl group comprising 1 to 18 carbon atoms, wherein $R^4$ is a chlorine atom or an alkoxy group comprising 1 to 4 carbon atoms, and wherein p is 0 or 1;
   the formulation 2 comprises water, an organic or inorganic acid, and at least one solvent or diluent; and
   the system is configured so that the first sealed vessel and the second sealed vessel can be unsealed and their respective contents mixed together shortly before application to the surface.

2. The two-component system of claim 1, wherein an amount of the at least one carbosilane in the formulation 1 is from 0.1 to 60% by weight, based on a total weight of the formulation 1.

3. The two-component system of claim 2, wherein the formulation 1 further comprises at least one solvent or diluent in an amount of from 40 to 99.9% by weight, based on the total weight of the formulation 1.

4. The two-component system of claim 1, wherein the formulation 1 further comprises at least one compound selected from the group consisting of:
   silanes of formula (III)

$$Si(R^5)_4 \quad (III)$$

wherein each $R^5$ is identical or different and each $R^5$ is a chlorine atom or an alkoxy group comprising 1 to 4 carbon atoms; and
   oligomeric silicic esters of formula (IV)

$$(R^6)_n SiO_{(4-n)/2} \quad (IV)$$

wherein each $R^6$ is identical or different and each $R^6$ is a hydroxyl group or an alkoxy group comprising 1 to 4 carbon atoms, and wherein n is 1 or 2 or 3.

5. The two-component system of claim 4, wherein the formulation 1 further comprises at least one solvent or diluent in an amount of from 40 to 99.9% by weight, based on a total weight of the formulation 1.

6. The two-component system of claim 4, wherein the at least one compound selected from the group consisting of the silanes of formula (III) and the oligomeric silicic esters of formula (IV) in the formulation 1 is present in an amount of from 0.001% by weight to less than 10% by weight, based on a total weight of the formulation 1.

7. The two-component system of claim 6, wherein the formulation 1 further comprises at least one solvent or diluent in an amount of from 40 to 99.9% by weight, based on the total weight of the formulation 1.

8. The two-component system of claim 1, wherein the formulation 1 further comprises at least one solvent or diluent in an amount of from 40 to 99.9% by weight, based on a total weight of the formulation 1.

9. The two-component system of claim 1, wherein the formulation 2 comprises water in an amount of at least 0.001 ppm by weight and less than 100% by weight, based on a total weight of the formulation 2.

10. The two-component system of claim 1, wherein the formulation 2 comprises the organic or inorganic acid in an amount of from 0.001 to 10% by weight, based on a total weight of the formulation 2.

11. The two-component system of claim 1, wherein the formulation 2 comprises the at least one solvent or diluent in an amount of from 0.01% by weight to less than 100% by weight, based on a total weight of the formulation 2.

12. The two-component system of claim 1, wherein the at least one solvent or diluent of the formulation 2 comprises at least one member selected from the group consisting of alcohols, glycols, ethylene glycol ethers, propylene glycol ethers, ketones, and esters.

13. The two-component system of claim 1, wherein the formulation 1 or the formulation 2 further comprises a wetting agent in an amount of less than 10% by weight, based on a total weight of the respective formulation.

14. A method of equipping at least one surface with an oil, water, and dirt repellent coating, comprising:
   cleaning and optionally pretreating the at least one surface;
   obtaining the two-component system of claim 1;
   opening the first sealed vessel and the second sealed vessel;
   combining and mixing the contents of the first sealed vessel and the second sealed vessel of the two-component system to form a mixture;
   reacting the mixture for at least 2 minutes; and
   applying the mixture to the at least one surface to provide the at least one surface with the repellent coating.

15. The method as claimed in claim 14, wherein cleaning and optionally pretreating the at least one surface comprises:
   degreasing the at least one surface; and
   pretreating the at least one surface with a metal oxide slurry.

16. The method of claim 14, wherein applying the mixture comprises applying the mixture at a temperature of from 0 to 50°C.

17. The method of claim 14, wherein applying the mixture comprises applying the mixture to the at least one surface by spraying, brushing, flowcoating, dipping, knife coating or polishing.

18. The method of claim 14, wherein the at least one surface comprises at least one material selected from the group consisting of a glass, a ceramic, a metal, and a polymer.

19. The method of claim 14, wherein cleaning and optionally pretreating the at least one surface comprises pretreating the at least one surface.

* * * * *